United States Patent
Sugita et al.

(10) Patent No.: US 7,125,447 B2
(45) Date of Patent: Oct. 24, 2006

(54) OIL-BASED INK COMPOSITION FOR INK-JET RECORDING

(75) Inventors: Yukio Sugita, Kanagawa (JP); Mitsuyoshi Tamura, Kanagawa (JP); Masahiro Nakamura, Nagano-Ken (JP); Seiji Mochizuki, Nagano-Ken (JP); Makoto Otsuki, Nagano-Ken (JP)

(73) Assignees: The Intec Inc., Tokyo (JP); Seiko Epson Corporation, Kanagawa (JP)

( * ) Notice: Subject to any disclaimer, the term of this patent is extended or adjusted under 35 U.S.C. 154(b) by 0 days.

(21) Appl. No.: 10/491,158

(22) PCT Filed: Jul. 16, 2003

(86) PCT No.: PCT/JP03/09021

§ 371 (c)(1),
(2), (4) Date: Aug. 24, 2004

(87) PCT Pub. No.: WO2004/007626

PCT Pub. Date: Jan. 22, 2004

(65) Prior Publication Data

US 2004/0266907 A1 Dec. 30, 2004

(30) Foreign Application Priority Data

Jul. 17, 2002 (JP) ............................. 2002-207853

(51) Int. Cl.
*C09D 11/02* (2006.01)

(52) U.S. Cl. ................. 106/31.58; 106/31.86; 523/160; 523/161

(58) Field of Classification Search .............. 106/31.58, 106/31.86; 523/160, 161
See application file for complete search history.

(56) References Cited

U.S. PATENT DOCUMENTS

| 4,255,196 | A  | * | 3/1981  | Emmons et al. | ......... 106/31.66 |
| 4,610,554 | A  | * | 9/1986  | Suzuki et al. | .......... 106/31.43 |
| 6,478,862 | B1 | * | 11/2002 | Elwakil | ...................... 106/31.6 |
| 6,749,675 | B1 | * | 6/2004  | Momose | ................... 106/31.58 |
| 2002/0044186 | A1 | * | 4/2002 | Tochihara et al. | .......... 347/100 |
| 2003/0083396 | A1 | * | 5/2003 | Ylitalo et al. | ................. 522/74 |

* cited by examiner

*Primary Examiner*—J. A. Lorengo
*Assistant Examiner*—Veronica F. Faison
(74) *Attorney, Agent, or Firm*—Ladas & Parry LLP

(57) ABSTRACT

An oil-based ink composition for ink jet recording of the present invention contains a colorant and at least 50% by weight of a mixed solvent made by mixing from 0.02 to 4 parts by weight of a lactone-type solvent with 1 part by weight of polyoxyethylene glycol dialkyl ether represented by the following general formula (1):

$$R^{11}-(OC_2H_4)_n-OR^{12} \qquad \text{General Formula (1)}$$

(wherein $R^{11}$, $R^{12}$ represent alkyl groups having from 1 to 3 carbon atoms and can be the same or different, and n is an integer from 2 to 4). The oil-based ink composition can be suitably used for printing on a polyvinyl chloride substrate and is excellent in all of print quality, printing stability, dry characteristics of printed matter, and storage stability of ink.

16 Claims, No Drawings

OIL-BASED INK COMPOSITION FOR INK-JET RECORDING

FIELD OF THE INVENTION

The present invention relates to an oil-based ink composition for ink jet recording.

BACKGROUND ART

As ink jet recording system, there are known various ink jet recording systems such as a system (electric field controlling system) in which ink is discharged using electrostatic attraction, a system (drop-on-demand system or pressure pulse system) in which ink is discharged using the oscillation pressure of a piezoelectric element, and a system (bubble or thermal system) in which ink is discharged using pressure developed by forming bubbles and allowing them to grow with heat. By any one of these systems, highly detailed images can be obtained.

In these ink jet recording systems, aqueous ink using water as a main solvent, and oil-based ink using an organic solvent as a main solvent are generally used. Matters printed with aqueous ink are generally poor in water resistance and printing with the aqueous ink on recording media having water-proof surface is difficult. On the other hand, oil-based ink has advantages that it can provide printed matters which are excellent in water resistance and that it can facilitate the printing on recording media having water-proof surface or wood free papers. Further, oil-based ink using pigment as colorant is excellent in light stability.

In conventional oil-based ink, however, an aromatic hydrocarbon such as toluene or xylene, an aliphatic hydrocarbon such as hexane or kerosene, a ketone group such as methyl-ethyl ketone, an ester group such as ethyl acetate, or propylene glycol mono-methyl ether acetate is generally used as organic solvent. However, the oil-based ink has the following problems. When printing is conducted on a polyvinyl chloride substrate as a recording medium with such an ink using organic solvent as mentioned above, nozzles are easily clogged because such an organic solvent has low boiling point and low flash point so as to easily dry. In addition, it is expensive to satisfy the printer specification because of the dissolving and swelling properties of such an organic solvent relative to plastics (for example, polystyrene resin and ABS resin) used in ink storage containers, apparatuses such as a printer, and parts thereof. Further, when printing is conducted on a polyvinyl chloride substrate, such oil-based ink cannot provide satisfactory print quality nor provide satisfactory dry characteristics of printed matter.

It is an object of the present invention to provide an oil-based ink composition for ink jet recording which can be suitably used for printing on a polyvinyl chloride substrate and is excellent in all of print quality, printing stability, dry characteristics of printed matter, and storage stability of ink.

DISCLOSURE OF THE INVENTION

An oil-based ink composition for ink jet recording of the present invention is characterized in that the oil-based ink composition contains a colorant and at least 50% by weight of a mixed solvent made by mixing from 0.02 to 4 parts by weight of a lactone-type solvent with 1 part by weight of polyoxyethylene glycol dialkyl ether represented by the following general formula (1):

$$R^{11}-(OC_2H_4)_n-OR^{12} \quad \text{General Formula (1)}$$

(wherein $R^{11}$, $R^{12}$ represent alkyl groups having from 1 to 3 carbon atoms and can be the same or different, and n is an integer from 2 to 4).

The oil-based ink composition is characterized in that the lactone-type solvent is a γ-lactone-type solvent.

The oil-based ink composition is characterized in that the γ-lactone-type solvent is γ-butyrolactone or γ-valerolactone.

The oil-based ink composition further contains from 0.01% to 48% by weight of at least one selected from solvents including polyoxyethylene glycol monoalkyl ether represented by the following general formula (2.), polyoxypropylene glycol monoalkyl ether represented by the following general formula (3), and triethyl citrate.

$$R^{21}-(OC_2H_4)_n-OH \quad \text{General Formula (2)}$$

(wherein $R^{21}$ represents alkyl groups having from 1 to 6 carbon atoms and n is an integer from 3 to 6)

$$R^{31}-(OC_3H_6)_n-OH \quad \text{General Formula (3)}$$

(wherein $R^{31}$ represents alkyl groups having from 1 to 4 carbon atoms and n is an integer from 2 to 3).

The oil-based ink composition is characterized in that the oil-based ink composition further contains a binder resin.

The oil-based ink composition is characterized in that the binder resin is (meth)acrylic resin.

The oil-based ink composition is characterized in that the (meth) acrylic resin is a homopolymer of methyl methacrylate or a copolymer of methyl methacrylate and butyl methacrylate.

The oil-based ink composition is characterized in that the (meth) acrylic resin has a molecular weight of from 10,000 to 150,000 and has a glass-transition temperature (Tg) of 40° C. or more.

The oil-based ink composition is characterized in that the (meth)acrylic resin and vinyl chloride-vinyl acetate copolymer resin and/or cellulose-type resin are used together as the binder resin.

The oil-based ink composition is used for printing on a polyvinyl chloride substrate.

BEST MODE FOR CARRYING OUT THE INVENTION

An oil-based ink composition for ink jet recording (hereinafter, sometimes referred to as only "oil-based ink composition") of the present invention comprises colorant and solvent. The solvent contains at least 50% by weight of a mixed solvent made by mixing from 0.02 to 4 parts by weight of a lactone-type solvent with 1 part by weight of polyoxyethylene glycol dialkyl ether represented by the above mentioned general formula (1) and preferably further contains from 0.01% to 48% by weight of at least one selected from solvents including polyoxyethylene glycol monoalkyl ether represented by the abovementioned general formula (2), polyoxypropylene glycol monoalkyl ether represented by the abovementioned general formula (3), and triethyl citrate. The colorant and binder resin are suitably dissolved or dispersed in the solvent with a dispersant, thereby obtaining the oil-based ink composition.

The present invention is based on the finding that lactone-type solvents are excellent in permeability relative to a polyvinyl chloride substrate and that the lactone-type solvents can provide ink having excellent leveling property and drying property when used together with polyoxyethylene glycol dialkyl ether represented by the abovementioned general formula (1). In addition, the lactone-type solvent and the polyoxyethylene glycol dialkyl ether represented by the abovementioned general formula (1) have high boiling points and low vapor pressure so that they provide good working environment.

The mixed solvent (hereinafter, referred to as "mixed solvent") obtained by mixing the polyoxyethylene glycol dialkyl ether represented by the abovementioned general formula (1) (hereinafter, referred to as "polyoxyethylene glycol dialkyl ether") and the lactone-type solvent will be described.

The polyoxyethylene glycol dialkyl ether is represented by the abovementioned general formula (1) wherein $R^{11}$, $R^{12}$ are straight-chain or branched-chain alkyl groups and has a boiling point of 150° C. or more, preferably 180° C. or more at an atmospheric pressure. Though there is no particular limitation of the upper limit, the upper limit may be about 240° C. considering the function thereof as an ink for ink jet recording. In addition, the density of the polyoxyethylene glycol dialkyl ether at a temperature of 20° C. is 0.9 g/cm$^3$ or more.

Specific examples of polyoxyethylene glycol dialkyl ethers are diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol ethyl methyl ether, triethylene glycol ethyl methyl ether, tetraethylene glycol ethyl methyl ether, diethylene glycol-di-n-propyl ether, and diethylene glycol-di-iso-propyl ether. Among them, diethylene glycol diethyl ether, triethylene glycol dimethyl ether, and diethylene glycol ethyl methyl ether are preferable.

The lactone-type solvent is a compound having ring structure formed by ester bonds such as γ-lactone having a 5-membered ring structure, δ-lactone having a 6-membered ring structure, or ε-lactone having a 7-membered ring structure. Specific examples are γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactone.

In the preferred embodiment of the present invention, the lactone-type solvent is γ-lactone having a 5-membered ring structure, more preferably, γ-butyrolactone, or γ-valerolactone.

In the mixed solvent, the lactone-type solvent is preferably from 0.02 to 4 parts by weight, more preferably from 0.05 to 2 parts by weight, relative to 1 part by weight of the polyoxyethylene glycol dialkyl ether represented by the abovementioned general formula (1). The oil-based ink composition preferably contains at least 50% by weight, more preferably 70% by weight or more, of the mixed solvent, whereby the oil-based ink composition becomes excellent in permeability relative to a polyvinyl chloride substrate, leveling property, and drying property.

In the oil-based ink composition for ink jet recording of the present invention, at least one selected from solvents represented by the abovementioned general formulae (2), (3) and triethyl citrate is preferably used in addition to the mixed solvent in order to prevent the volatilization and solidification of the oil-based ink composition at nozzles or inside tubes and to resolve the oil-based ink composition when solidified.

In the polyoxyethylene glycol monoalkyl ether represented by the abovementioned general formula (2), $R^{21}$ is an alkyl group having from 1 to 6, preferably from 1 to 4 carbon atoms and n is an integer from 3 to 6. Specific examples are triethylene glycol monomethyl ether, triethylene glycol monobutyl ether, tetraethylene glycol monomethyl ether, tetraethylene glycol monobutyl ether, pentaethylene glycol monomethyl ether, hexaethylene glycolmonomethyl ether. These may be used alone or in mixed state. The polyoxyethylene glycol monoalkyl ether has a boiling point of from 200° C. to 305° C., preferably 240° C. to 305° C. at an atmospheric pressure.

For the same purpose of the compound represented by the aforementioned general formula (2), nonionic polyoxyethylene derivative which is liquid at a room temperature and atmospheric pressure may be added. Specific examples include polyoxyethylene cetyl ethers such as Nissan Nonion P-208 (available from NOF Corporation) as polyoxyethylene alkyl ether series, polyoxyethylene oleyl ethers such as Nissan Nonion E-202S, E-205S (available from NOF Corporation), polyoxyethylene lauryl ethers such as EMALGEN 106, 108 (available from Kao Corporation), polyoxyethylene octyl phenol ethers such as Nissan Nonion HS-204, HS-205, HS-206, HS-208 (available from NOF Corporation) as polyoxyethylene alkyl phenol ether series, sorbitan monocaprylate such as Nissan Nonion CR-08R (available from NOF Corporation) as sorbitan monoester series, sorbitan monolaurate such as Nissan Nonion LP-20R (available from NOF Corporation), polyoxyethylene sorbitan monostearate such as Nissan Nonion OT-221 (available from NOF Corporation) as polyoxyethylene sorbitan monoester series, polymeric surfactant of polycarboxylic acid series such as FLOWLEN G-70 (available from Kyoeisha Chemical Co., Ltd.), polyoxyethylene higher alcohol ethers such as EMALGEN 707, 709 (available from Kao Corporation), tetraglycerin oleate such as POEM J-4581 (available from Riken Vitamin Co., Ltd.), nonyl phenol ethoxylate such as ADEKA TOL NP-620, NP-650, NP-660, NP-675, NP-683, NP686 (available from Asahi Denka Co., Ltd.), aliphatic phosphate esters such as ADEKA COL CS-141E, TS230E (available from Asahi Denka Co., Ltd.), sorbitan sesquioleate such as SORGEN 30 (available from Dai-ich Kogyo Seiyaku Co., Ltd.), sorbitan monooleate such as SORGEN 40 (available from Dai-ich Kogyo Seiyaku Co., Ltd.), polyethylene glycol sorbitan monolaurate such as SORGEN TW-20 (available from Dai-ich Kogyo Seiyaku Co., Ltd.), polyethylene glycol sorbitan monooleate such as SORGEN TW-80 (available from Dai-ich Kogyo Seiyaku Co., Ltd.). Besides the above examples, surface active agents of acetylene glycol series represented by the following formula may be employed:

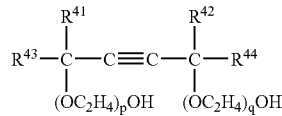

(wherein $0 \leq p+q \leq 50$, and $R^{41}$, $R^{42}$, $R^{43}$, $R^{44}$ are alkyl groups, preferably alkyl groups having from 1 to 6 carbon atoms).

Specific examples are 2,4,7,9-tetramethyl-5-decyne-4,7-diol, 3,6-dimethyl-4-octyne-3,6-diol, and 3,5-dimethyl-1-hexyne-3-ol. Examples as commercial products include Surfynol 104, 82, 465, 485, or TG (all of them are available from Air Products and Chemicals, Inc.) Olfine STG, Olfine E1010 (available from Nissin Chemical Industry Co., Ltd.), Nissan Nonion A-10R, A-13R (available from NOF Corporation), FLOWLEN TG-740W, D-90 (available from Kyoeisha Chemical Co., Ltd.), EMALGEN A-90, A-60 (available from Kao Corporation), and NOIGEN CX-100 (available from Dai-ich Kogyo Seiyaku Co., Ltd.). These polyoxyethylene derivatives may be added alone or in the mixed state.

Examples as polypropylene glycol monoalkyl ether represented by the general formula (3) include dipropylene glycol monomethyl ether, dipropylene glycol monoethyl ether, dipropylene glycol monopropyl ether, dipropylene glycol monobutyl ether, and tripropylene monomethyl ether. These may be used alone or in the mixed state. The polypropylene glycol monoalkyl ether has a boiling point of from 170° C. to 245° C., preferably from 180° C. to 240° C. at an atmospheric pressure.

The solvents represented by the abovementioned general formulae (2), (3) and triethyl citrate can impart the effect of inhibiting volatilization to the oil-based ink composition, thereby preventing the ink composition from evaporating in the tube for supplying the ink from an ink cartridge to a printer head so as to prevent or reduce the deposition of solid content of the ink composition. The content rate of the solvent is from 0.01 to 48% by weight, preferably from 5 to 30% by weight of the oil-based ink composition.

Though the solvents represented by the abovementioned general formulae (2), (3) and triethyl citrate may be used alone, various properties such as the dispersion stability of the colorant, the evaporation of the ink, and the viscosity of the ink can be controlled by adding two or more of them in combination.

Now, components to be dispersed or dissolved in the aforementioned solvent in the ink composition for ink jet recording of the present invention will be described.

Inorganic or organic pigments and dyes, which are generally used in conventional ink compositions, may be used as the colorant. Examples as the pigments include carbon black, cadmium red, molybdenum red, chrome yellow, cadmium yellow, titanium yellow, chrome oxide, viridian, titanium cobalt green, ultra marine blue, Persian blue, cobalt blue, diketo pyrrolo pyrrole, anthraquinone, benzimidazolone, anthrapyrimidine, azo-based pigments, phthalocyanine-based pigments, quinacridone-based pigments, iso-indolinone-based pigments, dioxazine-based pigments, threne-based pigments, perylene-based pigments, perynone-based pigments, tioindigo-based pigments, quinophthalone-based pigments, and metal chelate pigments. Examples as the dyes include azo dyes, metal chelate dyes, naphtol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes, and metal phthalocyanine dyes. Among these, the oil soluble dyes are particularly preferable. These pigments and dyes may be used alone or in combinations thereof as necessary. Pigments are better in terms of weather resistance. The volume-mean particle diameter of primary particles of the pigment is from 50 to 500 nm, preferably from 50 to 200 nm.

The content rate of the colorant is from 0.5% to 25% by weight, preferably from 0.5% to 15% by weight, more preferably from 1% to 10% by weight in the oil-based ink composition.

Any dispersant which is usually used in oil-based ink compositions, particularly in oil-based ink composition for ink jet recording can be used as the dispersant. Preferable dispersant is a dispersant effectively acting when the solubility parameter of the organic solvent is from 8 to 11. Commercial products having such characteristics may be used as the dispersant. Specific examples of such commercial products are polymers of polyester-type such as Hinoacto KF1-M, T-6000, T-7000, T-8000, T-8350P, T-8000EL (available from Takefu Fine Chemicals Co., Ltd.), solsperse 20000, 24000, 32000, 32500, 33500, 34000, 35200 (available from Avecia K.K.), disperbyk-161, 162, 163, 164, 166, 180, 190, 191, 192 (available from BYK-Chemie GmbH), FLOWLEN DOPA-17, 22, 33, G-700 (available from Kyoeisha Chemical Co., Ltd.), AJISPER PB821, PB711 (available from Ajinomoto-Fine-Techno Co., Inc.), LP4010, LP4050, LP4055, POLYMER 400, 401, 402, 403, 450, 451, 453 (available from EFKA chemicals B.V.). These may be used alone or in the mixed state.

The content ratio of the dispersant in the oil-based ink composition of the present invention is from 5% to 200% by weight, preferably from 30% to 120% by weight, relative to the content of the colorant (particularly pigment) in the ink composition. The content rate of the dispersant can be suitably selected according to the pigment to be dispersed.

The oil-based ink composition for ink jet recording of the present invention preferably contains a binder resin. The binder resin has solubility relative to the solvent and is added for the purpose of controlling the degree of viscosity of the oil-based ink composition and for providing the fixability relative to the polyvinyl chloride substrate. Examples are acrylic resin, stylene acrylic resin, modified rosin resin, phenol resin, terpene resin, polyester resin, polyamide resin, epoxy resin, vinyl chloride-vinyl acetate copolymer resin, cellulose-type resin such as cellulose acetate butyrate, and vinyl toluene-α-methylstylene copolymer resin. These can be used alone or in the mixed state.

The binder resin is preferably (meth) acrylic resin, that is, acrylic resin or methacrylic resin, more preferably a homopolymer of methyl methacrylate or a copolymer of methyl methacrylate and butyl methacrylate.

The molecular weight of the (meth) acrylic resin is from 10,000 to 150,000, preferably from 10,000 to 100,000. The glass-transition temperature (Tg) of the (meth)acrylic resin is 40° C. or more. Though there is no particular limitation of the upper limit, the upper limit of the glass-temperature is preferably 105° C.

Vinyl chloride-vinyl acetate copolymer resin and/or cellulose-type resin such as cellulose acetate butyrate are preferably used together with the (meth)acrylic resin, thereby increasing the adhesion relative to the substrate and controlling the viscosity of the ink.

The content rate of the binder resin is from 0.5 to 3 times, preferably from 0.75 to 1.6 times as the adding amount of the colorant (by weight).

Stabilizers such as an antioxidant and ultraviolet ray absorbent and/or surface-active agent can be added to the oil-based ink composition of the present invention. Examples of antioxidants includes BHA (2,3-butyl-4-oxyanisole), BHT (2,6-di-t-butyl-p-cresol). The content ratio of the antioxidant is from 0.01% to 3.0% by weight in the oil-based ink composition. As the ultraviolet ray absorbent, a benzophenone compound or a benzotriazole compound may be employed. The content ratio of the ultraviolet ray absorbent is from 0.01% to 0.5% by weight in the oil-based ink composition. As the surface-active agent, any of cationic, anionic, amphoteric, and nonionic surface active agents may be used. The content ratio of the surface-active agent is from 0.5% to 4.0% by weight in the oil-based ink composition.

According to the preparing method of the oil-based ink composition for ink jet recording of the present invention, the mixed solvent or a mixture made by mixing the solvent selected from a group consisting of the solvent represented by the abovementioned general formulae (2), (3) and triethyl citrate with the mixed solvent is employed as the solvent as the oil-based ink composition. The pigment and the dispersant are added to a part of the aforementioned solvent and mixed and dispersed by a ball mill, a bead mill, an ultrasonic homogenizer, or a jet mill so as to prepare a pigment dispersed liquid. The balance of the abovementioned solvent, the binder resin, and other additives are added to the obtained pigment dispersed liquid with conducting agitation.

The oil-based ink composition for ink jet recording thus obtained is adjusted to have a viscosity of from 2 to 10 mPa·s, preferably from 3 to 5 mPa·s at a temperature of 20° C.

The surface tension of the oil-based ink composition of the present invention is preferably from 20 to 50 mN/m. The surface tension less than 20 mN/m makes the ink composition to spread over the surface of the printer head for the ink jet recording or to leak out of the printer head so that the suitable ink drop discharge becomes difficult. The surface tension exceeding 50 mN/m disturbs proper spread of the ink over the surface of the recording medium, thus making the proper printing impossible.

The oil-based ink composition of the present invention has an advantage that it is inert to the surface of the discharge nozzle processed by ink repellent treatment. Therefore, the oil-based ink composition of the present invention can be advantageously used in an ink jet recording system in which ink is discharged from a printer head for ink jet recording having a discharge nozzle processed by the ink repellent treatment.

The oil-based ink composition for ink jet recording of the present invention is suitably adopted to the recording on a plastic substrate as a recording medium, particularly the recording on a rigid or flexible polyvinyl chloride substrate. Examples of polyvinyl chloride substrates include films and sheets. The oil-based ink composition for ink jet recording of the present invention has a beneficial effect of enabling the printing on a polyvinyl chloride substrate having surfaces without treatment, thereby eliminating the use of expensive recording media such as conventional recording media having receiving layers. Of course, the oil-based ink composition of the present invention can be adopted to the recording on a recording media of which surface is treated with ink receivable resin.

Hereinafter, the present invention will be described with concrete examples. However, these examples do not limit the scope of the present invention.

The viscosity was measured by using a viscometer "AMVn" available from Anton Paar GmbH. The particle diameter of pigment particles was measured by using "Microtrac UPA150" available from Nikkiso Co., Ltd.

EXAMPLE 1

A solvent of the following composition was prepared:

| | |
|---|---|
| γ-butyrolactone | 40.0 parts by weight |
| diethylene glycol diethyl ether | 28.0 parts by weight |
| dipropylene glycol monomethyl ether | 13.0 parts by weight |
| triethylene glycol monomethyl ether | 11.0 parts by weight |

3.5 parts by weight of carbon black ("MA-8" available from Mitsubishi Chemical Corporation) and 2.0 parts by weight of a dispersant (a polymer compound of polyester-type "Hinoacto KF1-M" available from Takefu Fine Chemicals Co., Ltd.) were added to a part of the solvent of the abovementioned composition and was agitated at 3,000 rpm by a dissolver for 1 hour. After that, the mixture was preliminarily dispersed by a bead mill filled with zirconia beads (2 mm). The mean particle diameter of pigment particles thus obtained was 5 μm or less.

Further, the preliminarily dispersed mixture was mainly dispersed by a nano mill filled with zirconia beads (0.3 mm) so as to obtain pigment-dispersed liquid. The mean particle diameter of pigment particles obtained by this main dispersion was 60 nm.

With agitating the obtained pigment-dispersed liquid at 4,000 rpm, 3.0 parts by weight of a binder resin (a copolymer of methyl methacrylate and butyl methacrylate "Paraloid B-99N", available from Rohm and Haas Company, having a molecular weight of 15,000 and a glass-transition temperature of 82° C.) and the balance of the mixed solvent prepared in the above were added, thereby preparing an oil-based ink composition for ink jet recording of the present invention. The viscosity was 4.1 mPa·s (at 20° C.).

EXAMPLE 2

A solvent of the following composition was prepared:

| | |
|---|---|
| γ-butyrolactone | 20.0 parts by weight |
| diethylene glycol diethyl ether | 48.0 parts by weight |
| dipropylene glycol monomethyl ether | 13.0 parts by weight |
| triethylene glycol monomethyl ether | 11.0 parts by weight |

An oil-based ink composition for ink jet recording was prepared in the same manner as in Example 1 except that the solvent of the abovementioned composition was used instead of the solvent of Example 1. The viscosity was 4.0 mPs·s (at 20° C.).

EXAMPLE 3

A solvent of the following composition was prepared:

| | |
|---|---|
| γ-butyrolactone | 20.0 parts by weight |
| diethylene glycol diethyl ether | 48.0 parts by weight |
| dipropylene glycol monomethyl ether | 13.0 parts by weight |
| tetraethylene glycol monobutyl ether | 11.0 parts by weight |

An oil-based ink composition for ink jet recording was prepared in the same manner as in Example 1 except that the solvent of the abovementioned composition was used instead of the solvent of Example 1. The viscosity was 4.2 mPs·s (at 20° C.).

EXAMPLE 4

A solvent of the following composition was prepared:

| | |
|---|---|
| γ-butyrolactone | 20.0 parts by weight |
| diethylene glycol diethyl ether | 52.0 parts by weight |
| dipropylene glycol monomethyl ether | 12.0 parts by weight |
| triethyl citrate | 11.0 parts by weight |

An oil-based ink composition for ink jet recording was prepared in the same manner as in Example 1 except that the solvent of the abovementioned composition was used instead of the solvent of Example 1. The viscosity was 4.2 mPa·s (at 20° C.).

EXAMPLE 5

A solvent of the following composition was prepared:

| | |
|---|---|
| γ-butyrolactone | 20.0 parts by weight |
| triethylene glycol diethyl ether | 50.0 parts by weight |
| dipropylene glycol monomethyl ether | 11.0 parts by weight |
| tetraethylene glycol monobutyl ether | 11.0 parts by weight |

An oil-based ink composition for ink jet recording was prepared in the same manner as in Example 1 except that the solvent of the abovementioned composition was used instead of the solvent of Example 1. The viscosity was 4.1 mPa·s (at 20° C.).

COMPARATIVE EXAMPLE 1

A solvent of the following composition was prepared:

| | |
|---|---|
| γ-butyrolactone | 20.0 parts by weight |
| diethylene glycol diethyl ether | 5.0 parts by weight |
| dipropylene glycol monomethyl ether | 55.0 parts by weight |
| triethylene glycol monomethyl ether | 12.0 parts by weight |

An oil-based ink composition for ink jet recording was prepared in the same manner as in Example 1 except that the solvent of the abovementioned composition was used instead of the solvent of Example 1. The viscosity was 4.4 mPs·s (at 20° C.).

COMPARATIVE EXAMPLE 2

A solvent of the following composition was prepared:

| | |
|---|---|
| diethylene glycol diethyl ether | 48.0 parts by weight |
| dipropylene glycol monomethyl ether | 33.0 parts by weight |
| tetraethylene glycol monobutyl ether | 11.0 parts by weight |

An oil-based ink composition for ink jet recording was prepared in the same manner as in Example 1 except that the solvent of the abovementioned composition was used instead of the solvent of Example 1. The viscosity was 3.9 mPs·s (at 20° C.).

COMPARATIVE EXAMPLE 3

A solvent of the following composition was prepared:

| | |
|---|---|
| γ-butyrolactone | 20.0 parts by weight |
| tripropylene glycol dimethyl ether | 48.0 parts by weight |
| dipropylene glycol monomethyl ether | 13.0 parts by weight |
| tetraethylene glycol monobutyl ether | 11.0 parts by weight |

An oil-based ink composition for ink jet recording was prepared in the same manner as in Example 1 except that the solvent of the abovementioned composition was used instead of the solvent of Example 1. The viscosity was 4.4 mPs·s (at 20° C.).

COMPARATIVE EXAMPLE 4

A solvent of the following composition was prepared:

| | |
|---|---|
| γ-butyrolactone | 20.0 parts by weight |
| diethylene glycol dibutyl ether | 48.0 parts by weight |
| dipropylene glycol monomethyl ether | 13.0 parts by weight |
| tetraethylene glycol monomethyl ether | 11.0 parts by weight |

An oil-based ink composition for ink jet recording was prepared in the same manner as in Example 1 except that the solvent of the abovementioned composition was used instead of the solvent of Example 1. The viscosity was 4.0 mPs·s (at 20° C.).

Printing was conducted on a polyvinyl chloride film (Viewcal 900: available from Lintec Corporation) by an ink jet printer (MJ-8000C; available from Seiko Epson Corporation) loaded with each of the inks prepared in Example 1 through Example 5, Comparative Example 1 through Comparative Example 4.

Matters printed with inks of Example 1 through Example 6, Comparative Example 1 through Comparative Example 4 were evaluated as follows and the results are shown in Table 1.

(1) Print Quality

Solid image and thin line pattern were printed. At that time, printed matters were visually observed to evaluate reproducibility. The results are shown in a row of Evaluation 1 in Table 1.

A: No blur was observed.

B: Ink Slightly blurred, but the printed pattern remains.

C: Ink blurred widely so as to spoil the formation of images.

(2) Printing Stability

The continuous printing was conducted at a room temperature. At that time, inspection was performed for dropouts of dots, curving motion of flying droplets, and satellite ink droplets.

A: The number of occurrences of dropouts of dots, curving motion of flying droplets, or satellite ink droplets after the elapse of 48 hours from the start of the printing was less than 10.

B: The number of occurrences of dropouts of dots, curving motion of flying droplets, or satellite ink droplets after the elapse of 48 hours from the start of the printing was from 10 to less than 20.

C: The number of occurrences of dropouts of dots, curving motion of flying droplets, or satellite ink droplets after the elapse of 24 hours from the start of the printing was 20 or more.

(3) Dry Characteristics

Solid image was printed. Time until the image dried at a temperature of 30° C. was measured.

A: Within 5 minutes.

B: From 5 minutes to 10 minutes.

C: 10 minutes or longer.

(4) Storage Stability of Ink 50 g of each ink composition was put in a glass bottle and the glass bottle was then hermetically sealed. The ink composition was left in this state at 60° C. for one week. After that, the ink composition was measured for properties, that is, the viscosity and the particle size distribution.

A: The difference in measurements of viscosity and particle size distribution between before being left and after being left was less than 5%.
B: The difference in measurements of viscosity and particle size distribution between before being left and after being left was less than 10%.
C: The difference in measurements of viscosity and particle size distribution between before being left and after being left was 10% or more.

so as to obtain pigment-dispersed liquid. The mean particle diameter of pigment particles obtained by this main dispersion was 60 nm.

With agitating the obtained pigment-dispersed liquid at 4,000 rpm, 3.0 parts by weight of a binder resin ("Paraloid B-99N", available from Rohm and Haas Company) and the balance of the mixed solvent prepared in the above were added, thereby preparing an oil-based ink composition for ink jet recording of the present invention. The viscosity was 3.9 mPa·s (at 20° C.).

TABLE 1

| Evaluation Items | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| 1 | A | A | A | A | A | C | C | C | B |
| 2 | A | A | A | A | A | A | A | B | C |
| 3 | A | A | A | A | A | C | C | C | A |
| 4 | A | A | A | A | A | B | A | B | C |

It was found from the above table that the oil-based ink compositions for ink jet recording of the present invention were satisfactory on all of the evaluation items. Comparative Examples 1 and 2 were poor in print quality and dry characteristics and Comparative Example 1 had some trouble in the storage stability of ink. Comparative Example 3 was poor in print quality and dry characteristics and had some trouble in the printing stability and the storage stability of ink. Comparative Example 4 was poor in printing stability and storage stability of ink and had some trouble in the print quality.

EXAMPLE 6

A solvent of the following composition was prepared:

| γ-valerolactone | 52.0 parts by weight |
| diethylene glycol diethyl ether | 30.0 parts by weight |
| tetraethylene glycol monobutyl ether | 10.0 parts by weight |

3.0 parts by weight of carbon black (C.I. PIGMENT BLACK 7) and 2.0 parts by weight of a dispersant (a polymer compound of polyester-type "solsperse 32000" available from Avecia K.K.) were added to a part of the solvent of the abovementioned composition and was agitated at 3,000 rpm by a dissolver for 1 hour. After that, the mixture was preliminarily dispersed by a bead mill filled with zirconia beads (2 mm). The mean particle diameter of pigment particles thus obtained was 5 μm or less.

Further, the preliminarily dispersed mixture was mainly dispersed by a nano mill filled with zirconia beads (0.3 mm)

EXAMPLE 7

A solvent of the following composition was prepared:

| γ-valerolactone | 20.0 parts by weight |
| diethylene glycol diethyl ether | 62.0 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6. The viscosity was 3.9 mPa·s (at 20° C.).

EXAMPLE 8

A solvent of the following composition was prepared:

| γ-valerolactone | 20.0 parts by weight |
| diethylene glycol diethyl ether | 50.0 parts by weight |
| dipropylene glycol monomethyl ether | 12.0 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6. The viscosity was 4.2 mPa·s (at 20° C.).

EXAMPLE 9

A solvent of the following composition was prepared:

| γ-valerolactone | 20.0 parts by weight |
| diethylene glycol diethyl ether | 50.0 parts by weight |
| dipropylene glycol monomethyl ether | 12.0 parts by weight |
| triethyl citrate | 10.0 parts by weight |

An oil-based ink composition for ink jet recording was prepared in the same manner as in Example 6 except that the solvent of the abovementioned composition was used instead of the solvent of Example 6. The viscosity was 4.2 mPa·s (at 20° C.).

EXAMPLE 10

A solvent of the following composition was prepared:

| | |
|---|---|
| γ-valerolactone | 20.0 parts by weiqht |
| triethylene glycol diethyl ether | 62.0 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6. The viscosity was 4.0 mPs·s (at 20° C.).

EXAMPLE 11

A solvent of the following composition was prepared:

| | |
|---|---|
| γ-valerolactone | 20.0 parts by weight |
| diethylene glycol diethyl ether | 62.0 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6. The viscosity was 4.2 mPa·s (at 20° C.).

EXAMPLE 12

A solvent of the following composition was prepared:

| | |
|---|---|
| γ-valerolactone | 20.0 parts by weight |
| triethylene glycol diethyl ether | 62.5 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6 and that "Paraloid B-60" available from Rohm and Haas Company (copolymer of methyl methacrylate and butyl methacrylate having a molecular weight of 60,000 and a glass-transition temperature of 75° C.) was used instead of the binder resin of Example 6 and its adding amount was 2.5 parts by weight. The viscosity was 4.1 mPa·s (at 20° C.).

EXAMPLE 13

A solvent of the following composition was prepared:

| | |
|---|---|
| γ-valerolactone | 20.0 parts by weight |
| diethylene glycol diethyl ether | 63.0 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6 and that "DEGALAN M825" available from Degussa Roehm GmbH (polymethyl methacrylate having a molecular weight of 80,000 and a glass-transition temperature of 105° C.) was used instead of the binder resin of Example 6 and its adding amount was 2.0 parts by weight. The viscosity was 4.4 mPs·s (at 20° C.).

EXAMPLE 14

A solvent of the following composition was prepared:

| | |
|---|---|
| γ-hexalactone | 20.0 parts by weight |
| diethylene glycol diethyl ether | 62.0 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6. The viscosity was 4.2 mPs·s (at 20° C.).

EXAMPLE 15

A solvent of the following composition was prepared:

| | |
|---|---|
| δ-valerolactone | 20.0 parts by weight |
| diethylene glycol diethyl ether | 62.0 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6. The viscosity was 4.2 mPs·s (at 20° C.).

EXAMPLE 16

A solvent of the following composition was prepared:

| | |
|---|---|
| γ-valerolactone | 20.0 parts by weight |
| diethylene glycol diethyl ether | 62.5 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6 and that "Paraloid B-67" available from Rohm and Haas Company (poly(isobutyl methacrylate) having a molecular weight of 60,000 and a glass-transition temperature of 50° C.) was used instead of the binder resin of Example 6 and its adding amount was 2.5 parts by weight. The viscosity was 4.1 mPs·s (at 20° C.).

EXAMPLE 17

A solvent of the following composition was prepared:

| | |
|---|---|
| γ-valerolactone | 20.0 parts by weight |
| diethylene glycol diethyl ether | 62.0 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6 and that 2.4 parts by weight of "Paraloid B-60" available from Rohm and Haas Company (copolymer of methyl methacrylate and butyl methacrylate having a molecular weight of 60,000 and a glass-transition temperature of 75° C.) and 0.6 parts by weight of "UCAR Solution vinyl VROH" available from Nihon Union Carbide Corporation (vinyl chloride-vinyl acetate copolymer having a molecular weight of 15,000 and a glass-transition temperature of 65° C.) were used instead of the binder resin of Example 6. The viscosity was 4.3 mPs·s (at 20° C.).

EXAMPLE 18

A solvent of the following composition was prepared:

| | |
|---|---|
| γ-valerolactone | 20.0 parts by weight |
| diethylene glycol diethyl ether | 62.0 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6 and that 2.9 parts by weight of "Paraloid B-60" available from Rohm and Haas Company (copolymer of methyl methacrylate and butyl methacrylate having a molecular weight of 60,000 and a glass-transition temperature of 75° C.) and 0.1 parts by weight of "CAB381-0.1" available from Eastman Chemical (cellulose-type resin having a molecular weight of 20,000 and a glass-transition temperature of 123° C.) were used instead of the binder resin of Example 6. The viscosity was 4.3 mPs·s (at 20° C.).

EXAMPLE 19

A solvent of the following composition was prepared:

| | |
|---|---|
| γ-valerolactone | 20.0 parts by weight |
| diethylene glycol diethyl ether | 62.7 parts by weight |
| tetraethylene glycol monobutyl ether | 10.0 parts by weight |

An oil-based ink composition for ink jet recording was prepared in the same manner as in Example 6 except that the solvent of the abovementioned composition was used instead of the solvent of Example 6 and that 2.3 parts by weight of "Paraloid B-66" available from Rohm and Haas Company (copolymer of methyl methacrylate and butyl methacrylate having a molecular weight of 7,000 and a glass-transition temperature of 50° C.) was used instead of the binder resin of Example 6. The viscosity was 4.3 mPs·s (at 20° C.).

COMPARATIVE EXAMPLE 5

A solvent of the following composition was prepared:

| | |
|---|---|
| γ-butyrolactone | 20.0 parts by weight |
| diethylene glycol diethyl ether | 5.0 parts by weight |
| dipropylene glycol monomethyl ether | 55.0 parts by weight |
| triethylene glycol monomethyl ether | 12.0 parts by weight |

An oil-based ink composition for ink jet recording was prepared in the same manner as in Example 6 except that the solvent of the abovementioned composition was used instead of the solvent of Example 6. The viscosity was 4.4 mPs·s (at 20° C.).

COMPARATIVE EXAMPLE 6

A solvent of the following composition was prepared:

| | |
|---|---|
| diethylene glycol diethyl ether | 48.0 parts by weight |
| dipropylene glycol monomethyl ether | 33.0 parts by weight |
| tetraethylene glycol monobutyl ether | 11.0 parts by weight |

An oil-based ink composition for ink jet recording was prepared in the same manner as in Example 6 except that the solvent of the abovementioned composition was used instead of the solvent of Example 6. The viscosity was 3.9 mPs·s (at 20° C.).

COMPARATIVE EXAMPLE 7

A solvent of the following composition was prepared:

| | |
|---|---|
| γ-butyrolactone | 20.0 parts by weight |
| tripropylene glycol dimethyl ether | 48.0 parts by weight |
| dipropylene glycol monomethyl ether | 13.0 parts by weight |
| tetraethylene glycol monobutyl ether | 11.0 parts by weight |

An oil-based ink composition for ink jet recording was prepared in the same manner as in Example 6 except that the solvent of the abovementioned composition was used instead of the solvent of Example 6. The viscosity was 4.4 mPs·s (at 20° C.).

COMPARATIVE EXAMPLE 8

A solvent of the following composition was prepared:

| | |
|---|---|
| γ-butyrolactone | 20.0 parts by weight |
| diethylene glycol dibutyl ether | 48.0 parts by weight |
| dipropylene glycol monomethyl ether | 13.0 parts by weight |
| triethylene glycol monomethyl ether | 11.0 parts by weight |

An oil-based ink composition for ink jet recording was prepared in the same manner as in Example 6 except that the solvent of the abovementioned composition was used instead of the solvent of Example 6. The viscosity was 4.0 mPs·s (at 20° C.).

EXAMPLE 20

A solvent of the following composition was prepared:

| | |
|---|---|
| γ-butyrolactone | 20.0 parts by weight |
| diethylene glycol diethyl ether | 62.0 parts by weight |
| tetraethylene glycol monobutyl ether | 10.0 parts by weight |

3.0parts by weight of C.I. PIGMENT BLUE (15:3) as colorant and 2.0 parts by weight of a dispersant (a polymer compound of polyester-type "solsperse 32000" available from Avecia K.K.) were added to a part of the solvent of the abovementioned composition and was agitated at 3,000 rpm by a dissolver for 1 hour. After that, the mixture was preliminarily dispersed by a bead mill filled with zirconia beads (2 mm). The pigment particles thus obtained were 5 μm or less.

Further, the preliminarily dispersed mixture was mainly dispersed by a nano mill filled with zirconia beads (0.3 mm) so as to obtain pigment-dispersed liquid. The mean particle diameter of pigment particles obtained by this main dispersal was 130 nm.

With agitating the obtained pigment-dispersed liquid at 4,000 rpm, 3.0 parts by weight of a binder resin ("Paraloid B-99N", available from Rohm and Haas Company) and the balance of the mixed solvent prepared in the above were added, thereby preparing an oil-based ink composition for ink jet recording of the present invention. The viscosity was 3.9 mPa·s (at 20° C.).

EXAMPLE 21

A solvent of the following composition was prepared:

| | |
|---|---|
| γ-butyrolactone | 20.0 parts by weight |
| diethylene glycol diethyl ether | 60.0 parts by weight |
| tetraethylene glycol monobutyl ether | 10.0 parts by weight |

An oil-based ink composition for ink jet recording was prepared in the same manner as in Example 20 except that the solvent of the abovementioned composition was used instead of the solvent of Example 20, that 3.0 parts by weight of C.I. PIGMENT RED 122 was used instead of the colorant of Example 20, and that 4.0 parts by weight of a dispersant (a polymer compound of polyester-type "solsperse 33500" available from Avecia K.K.) was used instead of the dispersant of Example 20. The viscosity was 4.2 mPs·s (at 20° C.).

EXAMPLE 22

A solvent of the following composition was prepared:

| | |
|---|---|
| γ-butyrolactone | 20.0 parts by weight |
| diethylene glycol diethyl ether | 60.0 parts by weight |
| tetraethylene glycol monobutyl ether | 10.0 parts by weight |

An oil-based ink composition for ink jet recording was prepared in the same manner as in Example 20 except that the solvent of the abovementioned composition was used instead of the solvent of Example 20, that 3.0 parts by weight of C.I. PIGMENT YELLOW 150 was used instead of the colorant of Example 20, and that 4.0 parts by weight of a dispersant (a polymer compound of polyester-type "solsperse 33500" available from Avecia K.K.) was used instead of the dispersant of Example 20. The viscosity was 4.3 mPs·s (at 20° C.).

Printing was conducted on a polyvinyl chloride film (Viewcal 900: available from Lintec Corporation) by an ink jet printer (MJ-8000C; available from Seiko Epson Corporation) loaded with each of the inks prepared in Example 6 through Example 22, Comparative Example 5 through Comparative Example 8.

Matters printed with inks of Example 6 through Example 22, Comparative Example 5 through Comparative Example 8 were evaluated in the same manner as the above and the results are shown in Table 2 and Table 3.

TABLE 2

| Evaluation Items | Example 6 | Example 7 | Example 8 | Example 9 | Example 10 | Example 11 | Example 12 | Example 13 | Example 14 | Example 15 | Example 16 |
|---|---|---|---|---|---|---|---|---|---|---|---|
| 1 | A | A | A | A | A | A | A | A | A | A | B |
| 2 | A | A | A | A | A | A | A | A | A | A | A |
| 3 | A | A | A | A | A | A | A | A | B | B | A |
| 4 | A | A | A | A | A | A | A | A | B | B | A |

TABLE 3

| Evaluation Items | Example 17 | Example 18 | Example 19 | Example 20 | Example 21 | Example 22 | Comparative Example 5 | Comparative Example 6 | Comparative Example 7 | Comparative Example 8 |
|---|---|---|---|---|---|---|---|---|---|---|
| 1 | A | A | A | A | A | A | C | C | C | B |
| 2 | A | A | A | A | A | A | A | A | B | C |
| 3 | A | A | A | A | A | A | C | C | C | A |
| 4 | A | A | A | A | A | A | B | A | B | C |

It was found from the above tables that the oil-based ink compositions for ink jet recording of the present invention were satisfactory on all of the evaluation items. Comparative Examples 5 and 6 were poor in print quality and dry characteristics and Comparative Example 5 had some trouble in the storage stability of ink. Comparative Example 7 were poor in print quality and dry characteristics and had some trouble in the printing stability and the storage stability of ink. Comparative Example 8 had poor printing stability and storage stability of ink and had some trouble in the print quality.

INDUSTRIAL APPLICABILITY

The oil-based ink composition for ink jet recording of the present invention can be suitably used for printing on a polyvinyl chloride substrate and is excellent in all of print quality, printing stability, dry characteristics of printed matter, and storage stability of ink.

What we claim is:

1. An oil-based ink composition for ink jet recording, wherein the oil-based composition consists essentially of:
   (1) 0.5 to 25% by weight of a colorant,
   (2) a binder resin that is 0.5 to 3 times as much as an amount of the colorant added,
   (3) a dispersant in an amount of 5 to 200% by weight with respect to the amount of the colorant added,
   (4) at least 50% by weight of a mixed solvent obtained by mixing 20/63 to 52/30 parts by weight of a lactone-type solvent with 1 part by weight of polyoxyethylene glycol dialkyl ether represented by the following general formula (1), and
   (5) 0.01 to 48% by weight of at least one solvent selected from the group consisting of polyoxyethylene glycol monoalkyl ether represented by the following general formula (2), polyoxypropylene glycol monoalkyl ether represented by the following general formula (3), and triethyl citrate:

$$R^{11}-(OC_2H_4)_n-OR^{12} \quad \text{General Formula (1)}$$

wherein $R^{11}$ and $R^{12}$ represent alkyl groups having 1 to 3 carbon atoms and can be the same or different, and n is integer of 2 to 4, $$R^{21}-(OC_2H_4)_n-OH \quad \text{General Formula (2)}$$

wherein $R^{21}$ represents alkyl groups having 1 to 6 carbon atoms, and n is integer of 3 to 6, and $$R^{31}-(OC_3H_6)_n-OH \quad \text{General Formula (3)}$$

wherein $R^{31}$ represents alkyl groups having 1 to 4 carbon atoms, and n is an integer of 2 to 3.

2. An oil-based ink composition for ink jet recording as claimed in claim 1, wherein the lactone-type solvent is γ-lactone-type solvent.

3. An oil-based ink composition for ink jet recording as claimed in claim 2, wherein the lactone-type solvent is γ-butyrolactone or γ-valerolactone.

4. An oil-based ink composition for ink jet recording as claimed in claim 1, wherein the colorant is a pigment.

5. An oil-based ink composition for ink jet recording as claimed in claim 1, wherein the binder resin is (meth) acrylic resin.

6. An oil-based ink composition for ink jet recording as claimed in claim 5, wherein the (meth) acrylic resin is a homopolymer of methyl methacrylate or a copolymer of methyl methacrylate and butyl methacrylate.

7. An oil-based ink composition or ink jet recording as claimed in claim 5, wherein the (meth) acrylic resin has a molecular weight of 10,000 to 150,000 and a glass transition temperature (Tg) of 40 C. or more.

8. An oil-based ink composition for ink jet recording as claimed in claim 5, wherein the binder resin comprises (meth) acrylic resin and vinyl chloride-vinyl acetate copolymer resin and/or a cellulosic resin.

9. A method for ink jet recording comprising the steps of: (a) providing the ink composition of claim 1, and (b) depositing the ink composition from an ink jet printer onto a polyvinyl chloride substrate to form print on the substrate.

10. A method for ink jet recording comprising the steps of: (a) providing the ink composition of claim 2, and (b) depositing the ink composition from an ink jet printer onto a polyvinyl chloride substrate to form print on the substrate.

11. A method for ink jet recording comprising the steps of: (a) providing the ink composition of claim 3, and (b) depositing the ink composition from an ink jet printer onto a polyvinyl chloride substrate to form print on the substrate.

12. A method for ink jet recording comprising the steps of: (a) providing the ink composition of claim 4, and (b) depositing the ink composition from an ink jet printer onto a polyvinyl chloride substrate to form print on the substrate.

13. A method for ink jet recording comprising the steps of: (a) providing the ink composition of claim 5, and (b) depositing the ink composition from an ink jet printer onto a polyvinyl chloride substrate to form print on the substrate.

14. A method for ink jet recording comprising the steps of: (a) providing the ink composition of claim 6, and (b) depositing the ink composition from an ink jet printer onto a polyvinyl chloride substrate to form print on the substrate.

15. A method for ink jet recording comprising the steps of: (a) providing the ink composition of claim 7, and (b) depositing the ink composition from an ink jet printer onto a polyvinyl chloride substrate to form print on the substrate.

16. A method for ink jet recording comprising the steps of: (a) providing the ink composition of claim 8, and (b) depositing the ink composition from an ink jet printer onto a polyvinyl chloride substrate to form print on the substrate.

* * * * *

UNITED STATES PATENT AND TRADEMARK OFFICE
CERTIFICATE OF CORRECTION

PATENT NO. : 7,125,447 B2 Page 1 of 1
APPLICATION NO. : 10/491158
DATED : October 24, 2006
INVENTOR(S) : Yukio Sugita et al.

It is certified that error appears in the above-identified patent and that said Letters Patent is hereby corrected as shown below:

On title page, item 73, "Intec" should read -- Inctec --, "Tokyo" should read -- Yokohama-shi -- and "Kanagawa" should read -- Tokyo --.

Signed and Sealed this

Thirtieth Day of October, 2007

JON W. DUDAS
*Director of the United States Patent and Trademark Office*